United States Patent [19]

Agarwal

[11] Patent Number: 4,688,167

[45] Date of Patent: Aug. 18, 1987

[54] SCREEN MANAGER FOR DATA PROCESSING SYSTEM

[75] Inventor: Arun K. Agarwal, Chelmsford, Mass.

[73] Assignee: Wang Laboratories, Inc., Lowell, Mass.

[21] Appl. No.: 655,280

[22] Filed: Sep. 27, 1984

[51] Int. Cl.[4] .................... G06F 3/14

[52] U.S. Cl. .................... 364/200; 340/734; 340/747

[58] Field of Search ... 364/200 MS File, 900 MS File, 364/300; 340/709, 712, 734, 735, 747

[56] References Cited

U.S. PATENT DOCUMENTS

| | | | |
|---|---|---|---|
| 4,189,727 | 2/1980 | Vaughn, Jr. | 340/711 |
| 4,475,156 | 10/1984 | Federico et al. | 364/300 |
| 4,484,302 | 11/1984 | Cason et al. | 364/900 |
| 4,533,910 | 8/1985 | Sukonick et al. | 340/721 |
| 4,550,315 | 10/1985 | Bass et al. | 340/703 |
| 4,555,775 | 11/1985 | Pike | 340/734 X |
| 4,559,533 | 12/1985 | Bass et al. | 340/747 X |
| 4,586,158 | 4/1986 | Brandle et al. | 364/900 |

FOREIGN PATENT DOCUMENTS 0121015 10/1984 European Pat. Off. .

OTHER PUBLICATIONS

Robins et al., "Viewporting in an Alphanumeric Display", IBM Tech. Disc. Bull. vol. 20, vol. 10, 3/78, pp. 4148-4151.

*Primary Examiner*—Raulfe B. Zache
*Attorney, Agent, or Firm*—Michael H. Shanahan; Gary D. Clapp

[57] ABSTRACT

In a multi-tasking data processing system, each task may request that the operating system set up descriptor blocks which identify virtual screens for display of data on the video display. Under keyboard control, only one virtual screen is selected for display at a given time. The operating system reserves a portion of the video display for displaying identifiers of the virtual screens which have been established but which are held in background. Each virtual screen may be subdivided into viewports by the corresponding application task. Those viewports are also identified in the operating system by descriptor blocks which point to pages of data in the document files. The descriptor blocks can be modified through requests from application tasks even when held in background. Whenever the display memory is updated, data designated by the descriptor blocks is passed through a rasterizer in the operating system which generates the pixel data to be stored in a display memory.

43 Claims, 11 Drawing Figures

SHEET 1

SHEET 2

SCREEN MANAGER FOR DATA PROCESSING SYSTEM

CROSS REFERENCE TO RELATED APPLICATIONS

This application is related to the following commonly assigned copending U.S. patent applications, namely: U.S. patent application Ser. Nos. 658,951 658,952, 658,953, 659,192 and 659,203 all filed on Oct. 9, 1984.

TECHNICAL FIELD

The present invention relates to display management in a data processing system and has particular application to word processing and office automation systems.

BACKGROUND

Word processing and office systems are primarily concerned with the generation, editing, displaying, printing and filing of documents. Those documents may include text in the case of word processing and they may include alphanumeric tables and graphics.

In addition to word processing tasks, the data processing systems may perform other tasks such as merging of forms, checking spelling through a dictionary task, spread sheet manipulation and communications. Less sophisticated systems allow only one such task to be performed at a given time. However, when a task requires little user input the keyboard remains idle. More sophisticated systems allow for multi-tasking. In such systems, an application task which requires little or no user input is performed by the system in a background mode; that is, the task does not interact with the keyboard and leaves the keyboard available to other tasks. A foreground task, on the other hand, which does require user input, interacts with the keyboard.

A common display technique for multi-tasking systems is referred to as windowing. In that technique, a document or a portion of a document being processed by the foreground task is predominantly displayed on the system display. Background documents relating to the background tasks are displayed in part so as to be perceived as being positioned below the foreground document but in partial view of the user. A background document can be moved into the foreground by positioning the display cursor over the selected background document. Only the task associated with the foreground document has access to the keyboard.

In another form of windowing, displays of documents associated with the various tasks are not overlapped. Rather, the various task windows are positioned in a side-by-side relationship.

DISCLOSURE OF THE INVENTION

The present invention relates to a data processing system having a central processing unit (CPU) which is controlled through an operating system program and application tasks software. Preferably, both the operating system and the application tasks are in the form of software which is loaded into a memory associated with the CPU. This system is also provided with a video display.

In accordance with one aspect of the invention, the CPU is able to process multiple application tasks together. A screen manager in the operating system is responsive to a plurality of application tasks to designate a plurality of virtual screens, all corresponding to the same single portion of the physical display screen. The screen manager is also responsive to an input to the data processing system, such as a keyboard input, to select one of the virtual screens for display at the single portion of the physical display screen under control of an application task. Further, the screen manager controls display of identifiers at a second portion of the physical display screen. The identifiers correspond to the several virtual screens. Each identifier displayed in the second portion of the physical display may include an indication as to when an error exists in a particular background application task.

Preferably, the virtual screens are identified by descriptor data blocks stored by the screen manager. The descriptor data blocks designate portions of stored documents which are more directly handled by the application tasks and which are to be displayed. In response to requests by application tasks, the descriptor blocks are modified even when the virtual screens to which the blocks relate are held in background and thus not displayed.

The only task with which the keyboard interacts is that which controls the displayed virtual screen. A virtual screen associated with any task may be selected by a keystroke on the keyboard. The screen manager responds to the keystroke to move the selected virtual screen into foreground.

A memory associated with the display may be a bit map memory which includes individual data corresponding to each pixel of the display. A screen manager system within the operating system may include a software based rasterizer which generates the individual pixel data.

In accordance with another aspect of the invention, the operating system screen manager is responsive to an application task to designate as a plurality of viewports distinct portions of the physical display screen. Distinct sections of document data stored in memory under control of the applications task are designated for each viewport. Each viewport designated after a first viewport is formed as a subdivision of a larger viewport. The screen manager controls display of each designated section of data in its corresponding viewport portion of the physical display screen. The screen manager responds to the application task to change the designated viewport portions of the physical display screen and thus change the size, position and number of viewports. Also, the screen manager responds to the application task to independently change the logical position of a viewport with respect to the document files and to thus independently change the display of data in each viewport. The display may also be updated, through the screen manager, to include changes in the stored data made by the application task.

Preferably, the designated viewports of the physical display screen are stored in descriptor data blocks controlled by the screen manager. The descriptor blocks also point to the sections of document data stored in memory which are to be displayed in the viewports. The viewports may be independently associated with different documents and may be updated independently. With the size of each viewport indicated by a descriptor block, the operating system screen manager causes as much of a stored document designated by the descriptor block to be displayed as can be displayed in the particular viewport. With changes in the size of a viewport, under control of an application task, the screen manager automatically responds to increase or decrease the amount of data from a stored document which is displayed. Also, changes in the logical position of a viewport relative to the stored document are controlled by the application task. For example, in response to an indication that the cursor has been moved beyond the logical position of the viewport, the screen manager may change the logical position of the viewport and automatically select the section of the document which is to be displayed. Under control of an application task, the screen manager may modify viewport descriptor blocks to further subdivide viewports or to merge viewports.

The viewport technique provides a flexible mechanism by which an application task can display data, most likely taken from different pages in the document files, in a side-by-side relationship. The ability to establish viewports is available to each application task. An application task can itself provide even greater flexibility by allowing for a subdivision of the sections of data, such as pages, which may be displayed in the viewports. Those subdivided areas can be independently controlled by the application task software but, unless modified by an application task, are seen as fixed side-by-side areas by the screen manager. Even further flexibility in the system is obtained by allowing each area to include multiple levels with one type of level including text and another including graphic information and the like. Those levels can be superimposed over each other when displayed in each area.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figure 1:
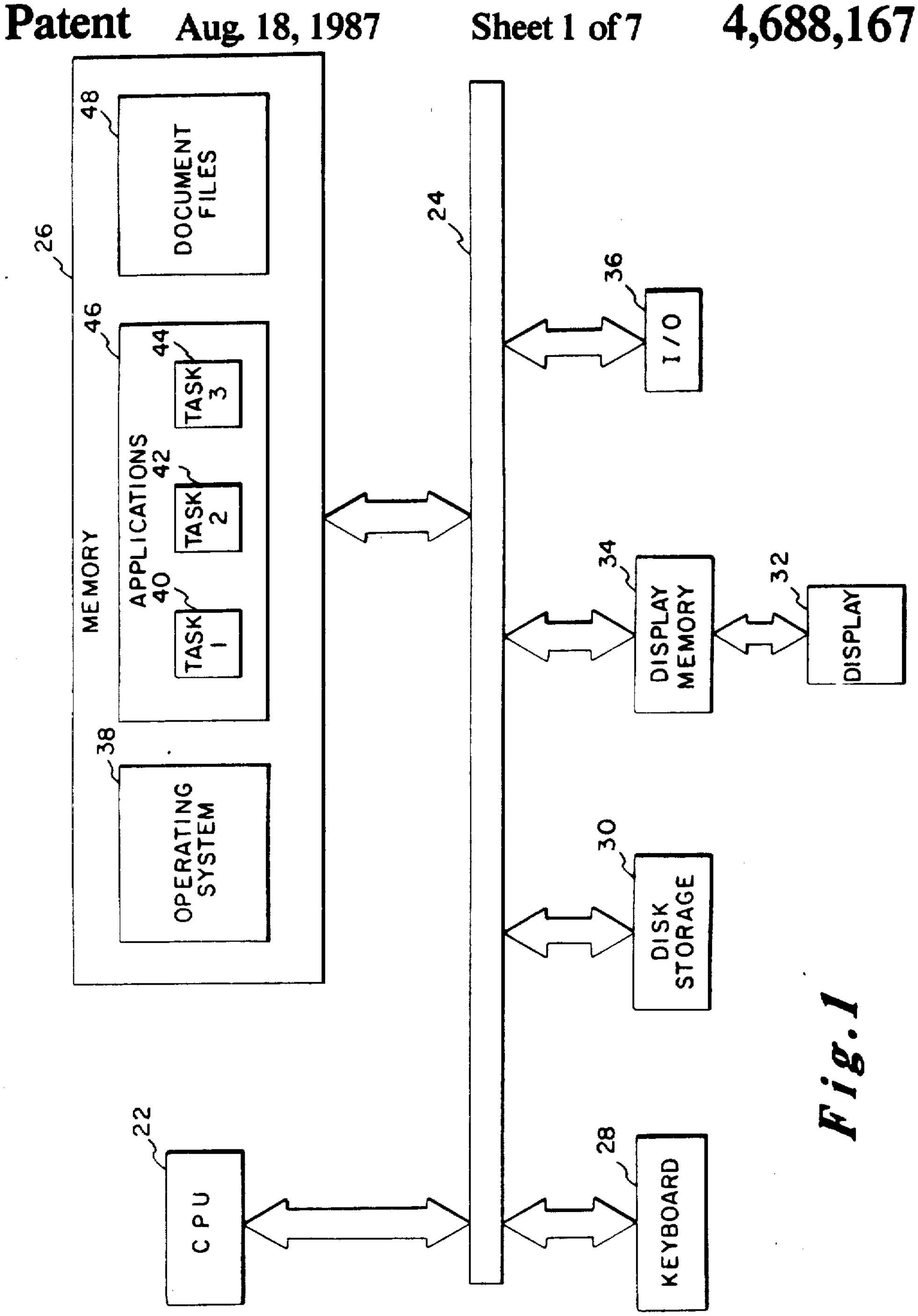
FIG. 1 is a block diagram illustrating a work station embodying the present invention.

FIG. 1 illustrates a typical multi-task work station which, under proper software control, embodies the present invention. At the heart of the system is a central processing unit (CPU) 22 which is preferably a single chip microprocessor. The CPU is joined through a work station bus 24 to a high speed electronic memory 26 and peripheral devices. The peripherals include a keyboard 28, a magnetic disc storage unit 30, a display 32 which is preferably a cathode ray tube display and an associated display memory 34. At least one input/output unit 36 is also connected to the bus 24. The input/output unit 36 includes a communications port for communicating with a printer, other work stations or a main processing unit. Although the present invention is described with respect to a standalone word processing and office automation system, the invention is equally applicable to other systems such as distributed systems.

During start-up of this system, the operating software 38 is loaded into the memory 26 from the disc storage 30. That software, the operating system, controls the general operation of the CPU and the associated peripherals and serves as an interface between the CPU and peripherals and the applications software. Once the system is running under control of the operating system, the system user may select, through the keyboard 28, any of a number of application software packages from disc storage 30 and load them into the memory 26. In the illustration of FIG. 1, three independent application packages 40, 42 and 44 have been loaded into the memory at 46.

The user may also select, through the keyboard 28 and by way of the operating system 38, documents from the disc storage 30 to be stored at 48 in the memory 26. In the case of word processing, a document may correspond to pages of hard copy text which may be printed out directly through the I/O port 36 and a printer. A document may also include graphics data. On the other hand, the document may only include data which is intended to be processed and not printed directly onto hard copy. Thus, the term document merely applies to a unit of data to be processed by the CPU under control of one or more application tasks.

The system of FIG. 1 is a multi-tasking system. That is, the CPU is able to process several application tasks together in a multiplexed fashion. However, as will be described in greater detail below, the system user interacts with only one of those tasks at a time through the display 32 and keyboard 28. For that one task, which is the foreground task, the user may enter text data and text/document manipulation commands by means of keystrokes through the keyboard 28. The work station responds by executing in the CPU 22 the appropriate routines selected by the operating system 38 and, through the operating system, by the applications task 46. In executing those routines, the CPU may modify the contents of documents in the document files 48 and display results of the user input through the display 32.

Figure 2:
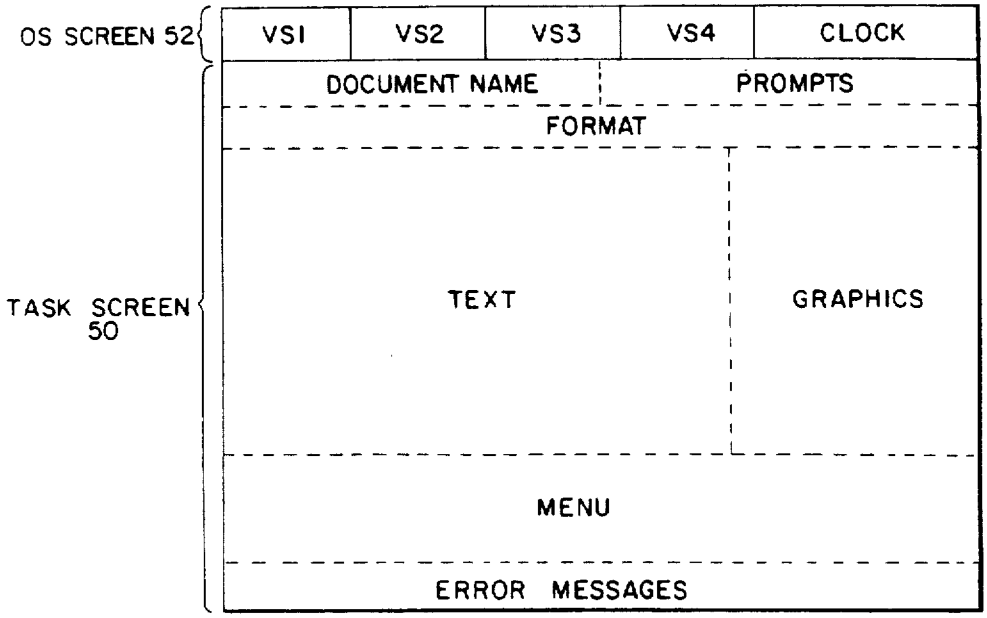
FIG. 2 illustrates a physical display screen displaying data in the system of FIG. 1 in accordance with principles of the present invention.

A typical display on the physical display screen of display 32 is illustrated in FIG. 2. A display from the foreground task is provided on a major portion of the physical display screen indicated as the task screen 50. Under control of the operating system to be described below, the display on the task screen may be divided into a number of display viewports each of which independently displays a different set of information. The viewports are shown separated by broken lines but such lines need not actually be displayed. As examples, on the display of FIG. 2 viewports are provided to display the document name, prompts, word processing page format, text, graphics, a user menu, and error messages. Of course, many other types of information can be displayed in different viewports and all of the viewports shown in FIG. 2 need not be displayed at any one time.

The viewport technique gives each application task great flexibility in designating the data to be displayed. That flexibility is obtained with little added complication to the application task software because it is controlled by the operating system once established by the application task. Once the viewports have been established, the application software need only be concerned with completing the task and modifying the data to be displayed as required by the task.

Figure 3:
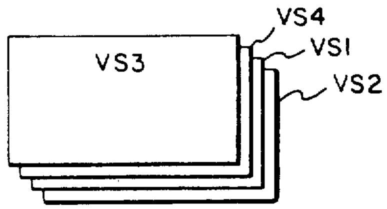
FIG. 3 is a schematic illustration of the logical arrangement of virtual screens to be displayed on the physical screen of FIG. 2.

As noted above, only the task with which the user is interacting at any time is permitted to control a display on the physical screen. Although background tasks are not permitted to control the display 32, the operating system establishes virtual screens corresponding to background applications. Those virtual screens can be considered, as shown in FIG. 3, to be the logical equivalent of a stack of pages including virtual screens VS1, VS2, VS3 and VS4. Only one of those virtual screens, in this case VS3, is displayed on the physical screen. The other virtual screens are held by the operating system for display when called by the operator.

In order that the system user can always be aware of the status of virtual screens which are not displayed, the operating system provides virtual screen identifiers in an OS screen portion 52. Each identifier may name the virtual screen and may also provide an indication as to the status of the task. The OS screen 52 may also include a calendar and clock display.

The virtual screen approach to windowing provides the advantages of more conventional windowing techniques while avoiding many of the disadvantages of those techniques. The technique allows the screen manager to maintain an identification of a block of data to be displayed for each task being handled by the system, and the displays associated with the various tasks are readily identified by the user and moved to the foreground. With conventional windowing techniques the area of the physical display screen available to each task is substantially reduced. As a result, a lesser amount of information can be displayed for each task or the information must be reduced in size. With the present technique, the foreground virtual screen is displayed across virtually the entire physical display screen. Further, the software required to implement the technique can be much less complex. Only one virtual screen is displayed at a time, so it is not necessary to determine which areas of a background screen are covered by a foreground screen and which portions must thus be suppressed from the display. The resultant reduced complexity of the software allows fcr much faster operation.

It can be seen that the present system offers windowing at two levels. At a task level, in virtual screen windowing a task window covers virtually the entire physical screen. Within each virtual screen established by a particular application task, that task can subdivide the virtual screen into viewport windows. Because each viewport is associated with an active task, the viewports are positioned side-by-side.

Figure 4:
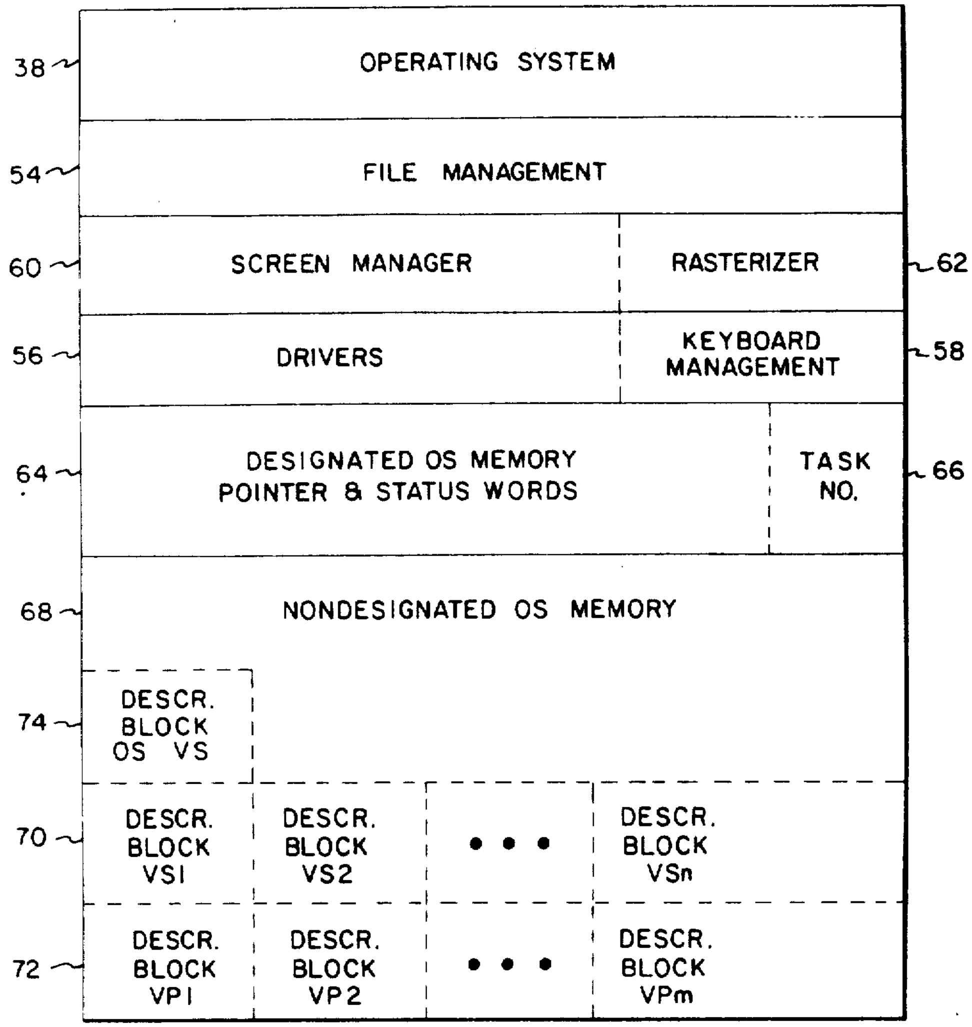
FIG. 4 is a block diagram representation of the logical breakdown of the operating system of the work station of FIG. 1.

FIG. 4 illustrates a logical breakdown of the operating system 38. Only those portions of the operating system which primarily relate to the handling of peripherals, and in particular the display 32, are broken out in FIG. 4. The file management system 54 manipulates data to and from the keyboard, disc storage and input-/output unit. The file managemert system interfaces with the peripherals through drivers 56 which include the software required for interfacing with the specific peripherals used. Of key importance with respect to this invention is the keyboard management driver 58.

The subject cf the present invention is the screen manager system 60. The screen manager directly controls the information to be displayed in the operating system screen 52 (FIG. 2), and it interacts with the application tasks to determine the information tc be displayed on the task screen and to define the virtual screens in background. The screen manager includes rasterizer software 62 which serves the function of a character generator and graphics generator for determining each pixel stored in the display memory 34 based on data received from document files 48.

The screen manager may also create a display not included in the data taken from the document files. For example, lines identifying the borders between viewports, such as illustrated by the broken lines in FIG. 2, may be created by the screen manager. Other bcrders, such as cross hatched strips, may also be created by the screen manager.

In addition to the memory in which the operating system prograxs are stored, additional memory is available to the cperating system. A portion 64 of that memory is designated to carry specific pointers and status words. Of particular interest with respect to the present invention is the indication 66 of the number cf the task which has control of the display and the keyboard at a given time. Indication 66 is set by the screen manager as it moves a virtual screen to the foreground. The keyboard management system 58 relies on that indication to determire which application task is to receive keyboard inputs.

The operating system also controls a larger section of memory 68. Virtual screen and viewport descriptor blocks, to be described in detail below, are stored in this section.

In order to display information on the display screen, an application task must first request that the operating system establish a virtual screen for the display. The CREATE VIRTUAL SCREEN request includes the task number of the requesting task which would have been previously designated by the operating system, a pointer to a six character string which identifies the virtual screen and a pointer to a page descriptor in the document files. It is the four character string which is displayed by the screen manager in the OS screen portion 52. In response to the request, the screen manager 60 creates a virtual screen descriptor block such as block 70 and a first viewport descriptor block such as block 77 and assigns a virtual screen number to the virtual screen block. The assigned virtual screen number is returned to the requester.

Figure 5:
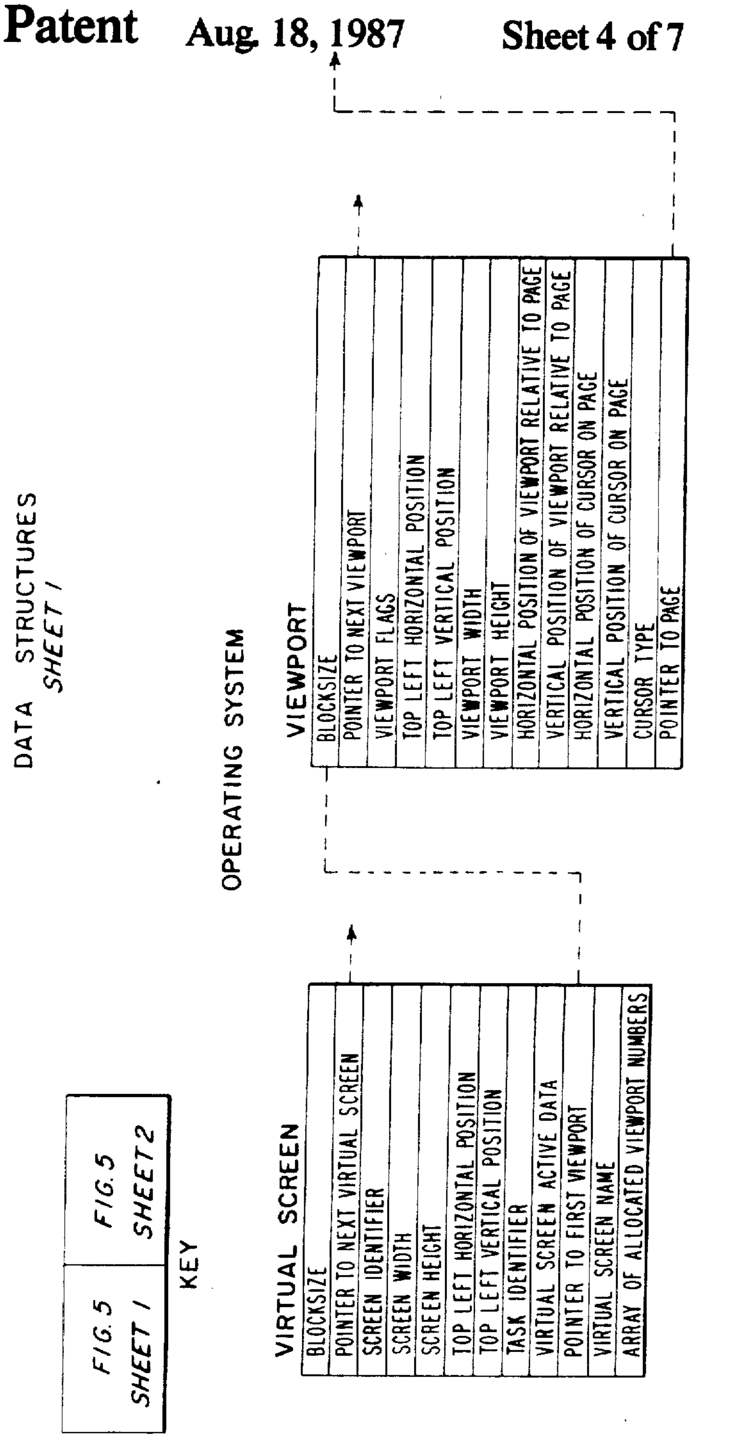
FIG. 5 illustrates the data structures in the system of FIG. 1.
Figure 5:
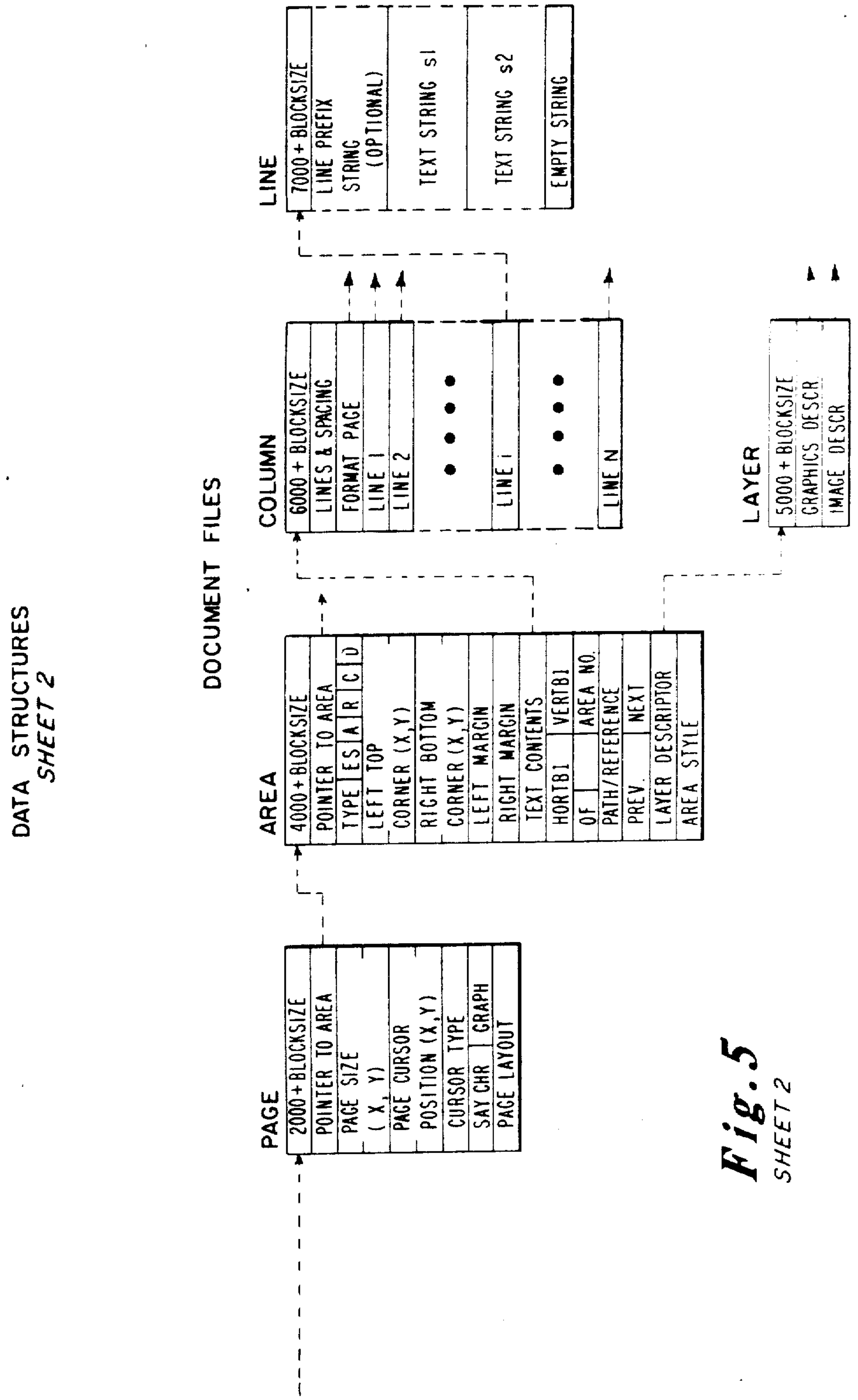

The data structures of the virtual screen and viewport descriptor blocks are shown in FIG. 5. A virtual screen description block includes a pointer to a first viewport descriptor block. The location and size of that first viewport corresponds to that of the entire virtual screen. If the primary viewport is subdivided into other viewports, each descriptor block of a subdivided viewport points to the next in a series of viewport descriptor blocks linked by pointers. Each descriptor block includes the location and size of its respective subdivision. It is also given a viewport number by which it can be identified in requests from the application task. Each viewport descriptor block in the chain points to a page descriptor block in the document files. As also shown in FIG. 5 each page descriptor block defines the size of the page and indicates the position of a cursor within the page.

The page descriptor to which the CREATE VIRTUAL SCREEN request and the resultant viewport point is a descriptor block defining the page of information which is to be displayed in the virtual screen. The virtual screen may be smaller than the page and in that case, the virtual screen can be considered a logical window over the upper left corner of the page when the virtual screen is first established. The cursor is also initially positioned in the upper left corner. The virtual screen window can be moved by movement of the cursor, indicated to the operating system by the applications task, or by a specific request from the applications task. When a cursor moves outside of that logical window on the page to be displayed, the screen manager automatically changes the position specification in the descriptor block. Thus, the descriptor block is dynamically controlled by the application task and at all times defires a logical window through which the cursor is viewed.

As noted above, the virtual screen or any viewport can be subdivided by establishing a new viewport descriptor block in the operating system. To that end, an application task issues a CREATE VIEWPORT request to the screen manager. That request includes the number of the virtual screen or any viewport to be subdivided, an indication as to whether the subdivision is to be horizontal or vertical, an indication as to whether the subdivision is to be fixed or proportional, an indication of the size of the subdivision. In response to such requests, the operating system establishes a descriptor block such as descriptor block 72 in memory and references that descriptor block in the descriptor block of a prior viewport which is being subdivided. Subsequently, by means of an ASSIGN request the application task can provide the screen manager with a pointer to be included in the descriptor block. That pointer points to the page descriptor of data which is to be displayed in the new viewport. Again, the viewport window is logically positioned at the upper left corner of the page. Also, the cursor is initially positioned at the upper left corner of the viewport. As with the virtual screen, each viewport within the screen can be repositioned with respect to its respective page in the document files by means of cursor movement indicated to the screen manager by the application task or by specific requests from the application task.

It can be seen that any number of virtual screens can be established by the screen manager in response to requests from application tasks and each virtual screen can be subdivided into any number of viewports by additional requests from the respective application task. Each virtual screen and each viewport is defined by a descriptor block which sets the size of the virtual screen or viewport, points to a page or document in the document files which is to be displayed in the virtual screen or viewport and sets the logical position of the screen or viewport relative to the page or document.

When a virtual screen is in the foreground, the screen manager relies on the descriptor blocks to designate the data from the document files which is to be displayed. That data is passed through the rasterizer 62 of the screen manager to generate the signal to be applied at each pixel of the display screen. The code for each pixel is stored in an 800 by 300 bit display memory 34. The screen manager also selects the information to be displayed on the operating system screen 52 designated in a descriptor block 74 and, through the rasterizer 62, stores corresponding pixel information in the memory 34.

The data stored in the memory 34 is continuously displayed by the display 32 until the memory is updated by the screen manager. The display memory 34 is updated in either of two situations. Where a foreground virtual screen or viewport descriptor block is modified, as when the logical position of a viewport on a page in the document files is changed, the screen manager immediately updates the display memory to pass the freshly indicated data from the document files 48 through the rasterizer 62. On the other hand, the application task may continuously update the data in the document files. The screen manager is unaware of those changes until an UPDATE request is made by the application task and does not update memory 34 until such a request is received. In response to the UPDATE request, the screen manager again selects the data from the document files to which the descriptor blocks point and passes that data through the rasterizer to update the display memory 34.

The screen manager is not concerned with the data included in document files pointed to by descriptor blocks associated with background virtual screens. The screen manager only becomes concerned with that information when the information is pointed to by a foreground descriptor block and memory 34 is to be updated. At that time the information is passed through the rasterizer to the display memory. Therefore, the screen manager does not respond to any update request with respect to background virtual screens. On the other hand, the virtual screen and corresponding viewport descriptor blocks must at all times be up to date so that when a particular background virtual screen is selected for movement into foregound, the information that the application task requires to be displayed is immediately and properly displayed. Therefore, the screen manager must respond to specific requests to modify background descriptor blocks and to cursor movements which move the logical positions of background descriptor blocks even though modifications of background descriptor blocks do not result in an immediate response on the display 32.

Figure 6A:
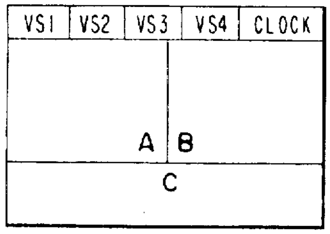
FIGS. 6A and 6B respectively illustrate a physical display screen displaying in a single viewport three areas of text from a stored document and the logical position of the viewport with respect to the stored document.
Figure 6B:
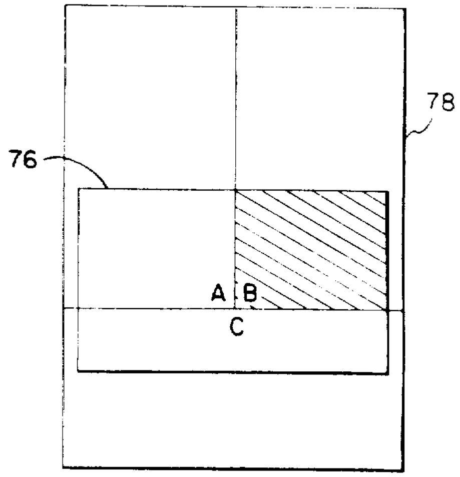

In order to minimize the amount of data which must be updated, the application task requesting an update may specify less than an entire virtual screen or viewport. An example is illustrated in FIGS. 6A and 6B. FIG. 6A represents the physical screen which displays a virtual screen which has not been subdivided into viewports. The logical position of the virtual screen 76 over a page 78 in the document files is illustrated in FIG. 6B. The page 78 is divided in the document files into three areas A, B and C. Areas A and B may, for example, correspond to two columns of text and area C may correspond to text extending across the full width of the page. In a particular application, it may only be necessary to update area B on the page 78. Thus the application task requests the operating system screen manager to update area B only. The screen manager recognizes that only the portion of area B overlapping the virtual screen 76 need be updated in the display memory 34. Therefore, only the cross-hatched area in FIG. 6B is actually updated. By thus limiting the amount of information which must be updated, the updating function can be completed in less time.

The subdivision of each page into areas is accomplished by the data structures of FIG. 5. It can be seen that the page descriptor block includes a pointer to an area descriptor block. The area descriptor block establishes the locations of diagonal corners of a square area. It may also include indications of the left and right margins on which the screen manager may rely to minimize the amount of rasterization processing required for the area. The area also points to one or both of a text column descriptor block and a layer descriptor block. The column descriptor block includes a number of pointers to several lines of text included in the column. Each line descriptor block to which the column block points includes one or more strings of text. The same area may also point to a layer descriptor block which in turn points to either a graphics descriptor or an image descriptor. Because the area block can point to both a text column block and a layer block, text, graphics and imagery can be superimposed in the single area.

It can be noted that the area descriptor block also includes a pointer to the next area within the page. That area may similarly point to text and/or graphics data and a subsequent area.

Figure 7A:
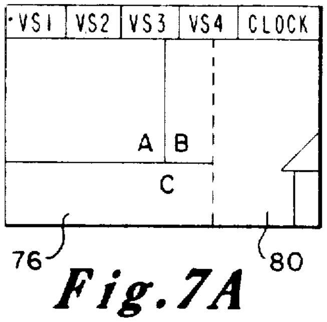
FIG. 7A illustrates the physical screen of FIG. 6A after the single viewport has been subdivided into two viewports.
Figure 7B:
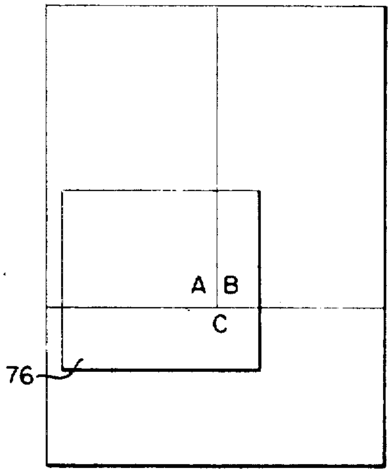
FIGS. 7B and 7C illustrate the logical location of each viewport over associated stored documents.
Figure 7C:
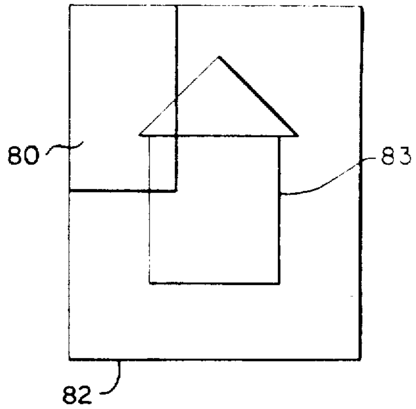

FIGS. 7A through 7C illustrate the subdivision of the virtual screen 76 of FIG. 6B into two viewports. A CREATE VIEWPORT request is first made to the screen manager. That request defines the size and location of a viewport shown at 80 to the right of the physical screen in FIG. 7A. The two viewports are shown separated by broken lines, but such lines need not be included on the actual display. With the establishment of the viewport 80, the screen manager automatically reduces the text from the document files which is displayed in the primary viewport 76, as can be seen by comparison of FIGS. 6B and 7B.

An ASSIGN request is next issued by the application task to the screen manager to assign the viewport 80 to a page of data in the document files 48. That page 82 may, for example, include graphics 83. The newly assigned viewport is initially positioned in the upper left corner of the page 82. Only that part of the page logically within the viewport, as illustrated in FIG. 7C, is actually displayed, as shown in FIG. 7A. The viewport can be logically repositioned on the page by cursor movement or specific command.

To subsequently remove the viewport 80, a MERGE request is made by the application task to merge the viewport 80 back into the virtual screen. The result is that the primary viewport 76 returns to the full size of the virtual screen as shown in FIGS. 6A and 6B.

It can be understood that the virtual screens are created by the application task and are resources assigned to the application task. An application task may create multiple virtual screens. The application task must release the virtual screen before it terminates or whenever it does not need the virtual screen. The virtual screen is released by a DELETE request from the application task to the screen manager. The screen manager then deletes the virtual screen and the corresponding viewport descriptor blocks from the data structures and updates the display to show the next sequential virtual screen.

Figure 8:
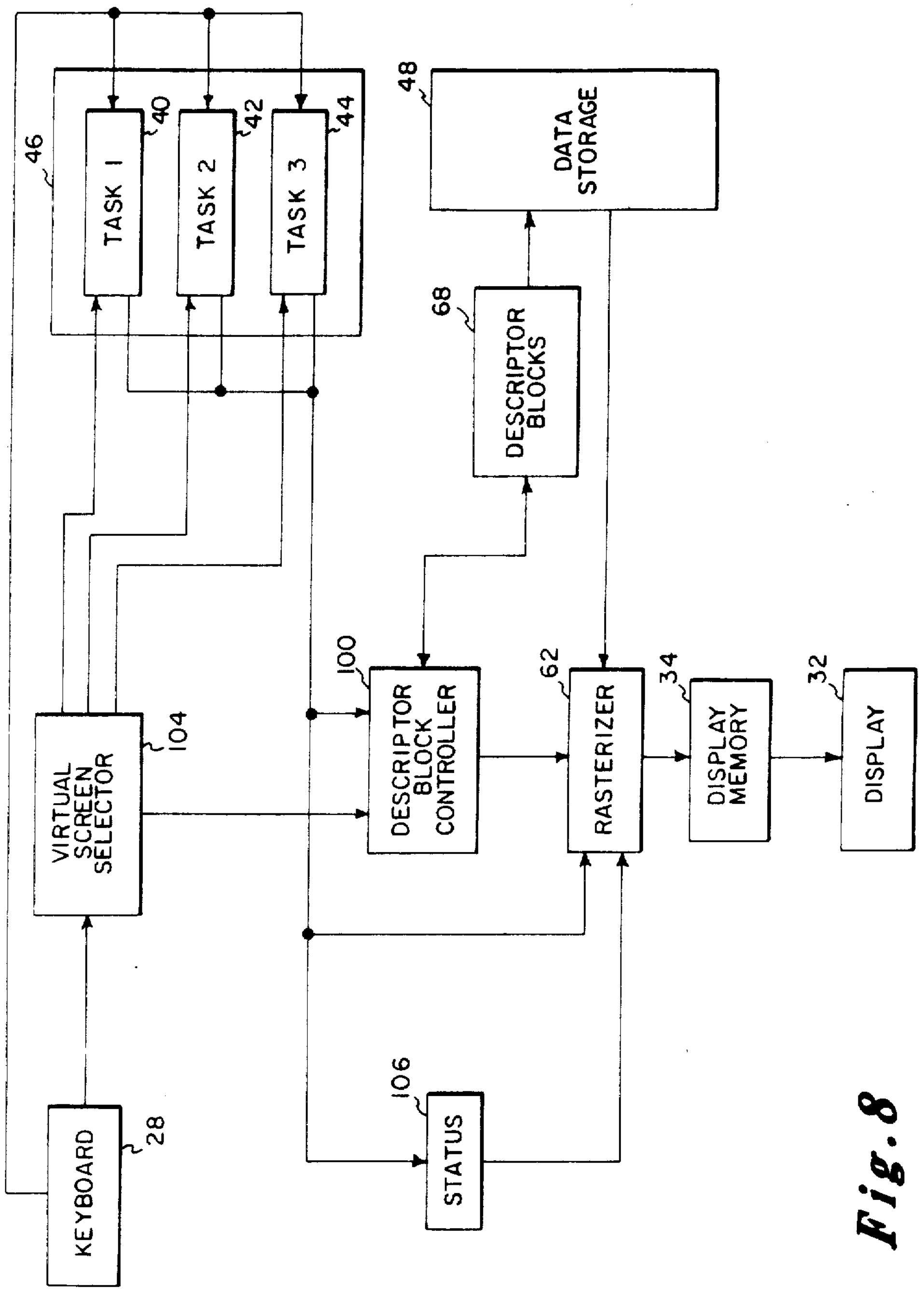
FIG. 8 is a functional block diagram of the system.

A functional block diagram of the system is shown in FIG. 8. Through a controller 100 in the operating system, each application task 40, 42 and 44 is able to create and modify virtual screen and viewport descriptor blocks 68 (FIGS. 4 and 5). This controller handles the several functions described above. In particular, it implements the CREATE VIRTUAL SCREEN, CREATE VIEWPORT, ASSIGN, UPDATE, MERGE, AND DELETE functions with respect to particular descriptor data blocks 68.

A virtual screen selector 104 responds to keyboard input to designate the application task which has access to the keyboard and to indicate that task to the descriptor block controller 100. The controller 100 in turn selects the virtual screen descriptor blocks associated with the selected application task. The selected viewport descriptor blocks are used by the controller 100 to designate viewports within the virtual screen to the rasterizer 62. The selected descriptor blocks also designate the data in storage 48 which is also to be applied to the rasterizer 62.

Finally, the status of each application task is monitored by monitor 106 and applied to the rasterizer 62. From these inputs, the rasterizer generates a complete video display. Updating the display may be made in response to signals from application tasks when the underlying data is changed or in response to changes in descriptor blocks.

The present system has several advantages over conventional windowing techniques in multi-tasking systems. In conventional windowing techniques, several displays corresponding to the virtual screens of the present application are overlapped but spatially offset from each other on the physical screen. The result is the need for a very complex rasterization routine. To handle that routine rapidly, it is best handled by hardware rather than by software control. However, hardware control is relatively inflexible, particularly with respect to type of character which is displayed. By displaying only one virtual screen at a time, the rasterization process is greatly simplified and can be handled rapidly under software control. With software control, much greater flexibility is obtained.

The present technique also allows for the virtual screen of primary interest to make up a much larger portion of the physical screen. The use of the operating screen 52 in the display gives the operating system sufficient opportunity to keep the user informed as to the status of virtual screens which are not displayed.

Further, the ability of the operating system to establish viewports in each virtual screen greatly adds to the flexibility of the system, particularly with respect to displaying different types of data such as text and graphics. The information displayed in different viewports can also be selected from different pages and even different documents in the document files 48. The example of displaying text adjacent to graphics using the viewport technique has previously been noted. Establishing viewport descriptor blocks for other items such as the menu and error messages of FIG. 2 makes the screen manager operations extremely flexible. It also minimizes the amount of updating of the screen. For example, in order to update the prompts viewport, which may require frequent updating, it is not necessary to as frequently update the entire screen. Similarly, when word processing, it may only be necessary to update the text viewport and not the other viewports at particular stages of an application task.

The ability of the applications task to further subdivide pages into areas adds yet another dimension to the control of information to be displayed. It allows the application task to establish areas to be displayed in a relatively fixed relationship as far as the screen manager is concerned; whereas, the viewport technique requires the screen manager to handle each viewport more independently. Establishing areas simplifies certain tasks of the application software such as formating, wraparound within columns and the like.

Finally, the ability to superimpose text and graphics for imagery adds yet another dimension to the display of information.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. In a data processing system comprising a CPU controlled through an operating system and application tasks so as to be able to process multiple application tasks together, a data storage memory, a keyboard for interacting with application tasks, and a video display, having a physical display screen, responsive to the application tasks, the operating system having a screen manager comprising:

means responsive to a plurality of application tasks to designate a plurality of virtual screens, all virtual screens corresponding to the same, single portion of the physical display screen;

means responsive to an input to the data processing system to select one of the virtual screens for display at said single portion of the physical display screen under control of an application task; and means for controlling display, at a second portion of the physical display screen, of identifiers corresponding to the designated virtual screens.

2. A data processing system as claimed in claim 1 wherein the virtual screens are designated in descriptor data blocks stored by the screen manager and the descriptor blocks point to stored data processed through the application task which is to be displayed, and wherein the screen manager further comprises means for modifying the descriptor blocks in response to application tasks regardless of whether a virtual screen associated with a particular descriptor block is at that time being displayed.

3. A data processing system as claimed in claim 1 wherein the only task with which the keyboard interacts is that which controls the displayed virtual screen.

4. A data processing system as claimed in claim 3 wherein the screen manager responds to a keystroke to update the display to a different virtual screen.

5. A data processing system as claimed in claim 4 wherein the identifiers displayed in the second portion of the physical display screen indicate the status of the background tasks.

6. A data processing system as claimed in claim 1 wherein the information to be displayed is stored in a display memory on a pixel by pixel basis and the screen manager further comprises a software based rasterizer for generating individual pixel data from data in the data storage memory pointed to by the designated virtual screens.

7. In a data processing system comprising a CPU controlled through an operating system and an application task so as to be able to process the application task, a data storage memory, and a video display, having a physical display screen, responsive to the application task, the operating system having a screen manager comprising:

means responsive to an application task to designate as a plurality of viewports distinct portions of the physical display screen and to designate corresponding distinct sections of data, stored in the data storage memory, to be displayed in the respective viewports, each viewport designated after a first viewport being formed as a subdivision of a larger viewport;

means for controlling display of each designated section of data in its corresponding viewport portion of the physical display screen;

means responsive to the application task for changing the designated distinct viewport portions of the physical display screen and for independently, for each viewport, changing the designated distinct sections of stored data corresponding to each viewport and to thus change the display of data; and means for updating the display to include changes in the stored data made by the application task.

8. A data processing system as claimed in claim 7 wherein each of the viewports and the corresponding sections of data are designated in descriptor data blocks by the screen manager.

9. A data processing system as claimed in claim 8 wherein each descriptor block includes the size of a viewport and its logical location relative to data in the data storage memory.

10. A data processing system as claimed in claim 9 wherein the screen manager further comprises means for changing the logical position specified in the viewport descriptor data block in response to a cursor position indicated by the application task.

11. A data processing system as claimed in claim 8 wherein the screen manager comprises means for further subdividing viewports into smaller viewports.

12. A data processing system as claimed in claim 11 wherein the screen manager comprises means for merging viewports to remove a subdivision of a viewport.

13. A data processing system as claimed in claim 7 wherein the distinct sections of data may be included in distinct documents in the data storage memory.

14. A data processing system as claimed in claim 7 wherein the means for updating the display to include changes in the stored data made by the application task provides for updating of viewports independently.

15. A data processing system as claimed in claim 7 further comprising in application task software means for subdividing said distinct sections of data, stored in the data storage memory, into areas displayed in the fixed side-by-side relationship when displayed through the screen manager and independently controlled by the application task software.

16. A data processing system as claimed in claim 15 wherein the application task software includes means for designating both text and other data to be superimposed in the area.

17. A data processing system as claimed in claim 7 wherein the screen manager comprises means for providing a border display at the interfaces of viewports.

18. In a data processing system comprising a CPU controlled through an operating system and application task software so as to be able to process the application task, a data storage memory, and a video display, having a physical display screen, responsive to the application task, the system further comprising A. a screen manager in the operating system comprising:

means responsive to an application task to designate as a plurality of viewports distinct portions of the physical display screen and to designate corresponding distinct sections of data, stored in the data storage memory, to be displayed in the respective viewports;

means for controlling display of each designated section of data in its corresponding viewport portion of the physical display screen;

means responsive to the application task for changing the designated distinct viewport portions of the physical display screen and for independently, for each viewport, changing the designated distinct sections of stored data corresponding to each viewport and to thus change the display of data; and means for updating the display to include changes in the stored data made by the application task; and B. the application task software comprising means for subdividing said distinct sections of data, stored in the data storage memory, into areas displayed in a fixed side-by-side relationship when displayed through the operating system and independently controlled by the application task software.

19. A data processing system as claimed in claim 18 wherein the application task software includes means for designating both text and other data to be superimposed in the area.

20. In a data processing system comprising a CPU controlled through an operating system and application tasks so as to be able to process multiple application tasks together, a data storage memory, a keyboard for interacting with application tasks, and a video display, having a physical display screen, responsive to the application tasks, the operating system having a screen manager comprising:

means responsive to a plurality of application tasks to designate a plurality of virtual screens for independent display on the physical display screen;

means responsive to an input to the data processing system to select one of the virtual screens for display under control of an application task;

means responsive to an application task to designate as a plurality of viewports distinct portions of the physical display screen and to designate corresponding distinct sections of data stored in data storage memory to be displayed in the respective viewports;

means responsive to an application task for changing the designated distinct viewport portions of the physical display screen and for indepently, for each viewport, changing the designated distinct sections of stored data corresponding to that viewport and to thus change the display of data; and means for updating the display to include changes in the stored data made by an application task.

21. A data processing system as claimed in claim 20 wherein each of the viewports and the corresponding sections of data are designated in descriptor data blocks by the operating system.

22. A data processing system as claimed in claim 21 wherein the virtual screens are designated in descriptor data blocks stored by the operating system and the descriptor blocks point to stored data processed through the application task which is to be displayed, and wherein the screen manager further comprises means for modifying the descriptor blocks in response to application tasks regardless of whether a virtual screen associated with a particular descriptor block is at that time being displayed.

23. A data processing system as claimed in claim 21 wherein the only task with which the keyboard interacts is that which controls the displayed virtual screen.

24. A data processing system as claimed in claim 20 wherein the information to be displayed is stored in a display memory on a pixel by pixel basis and the screen manager further comprises a software based rasterizer for generating individual pixel data from data in the data storage memory pointed to by the designated virtual screens.

25. A data processing system as claimed in claim 20 further comprising means for controlling display, at a second portion of the physical display screen, of identifiers corresponding to the designated virtual screens.

26. A data processing system as claimed in claim 20 wherein the operating system comprises means for providing a border display at the interfaces of viewports.

27. A data processing system as claimed in claim 20 further comprising in application task software means for subdividing said distinct sections of data, stored in the data storage memory, into areas displayed in the fixed side-by-side relationship when displayed through the screen manager and independently controlled by the application task software.

28. A data processing system as claimed in claim 27 wherein the application task software includes means for designating both text and other data to be superimposed in the area.

29. A method of displaying data in a data processing system comprising:

responsive to a plurality of application tasks, designating in an operating system of the data processing system a plurality of virtual screens, each virtual screen corresponding to a portion of the physical display screen;

selecting one of the virtual screens and displaying that virtual screen in a first portion of the physical display screen in response to an input to the data processing system; and displaying in a second portion of the physical display screen identifiers corresponding to the designated virtual screens.

30. A method as claimed in claim 29 wherein the virtual screens are designated in descriptor data blocks stored by the operating system and the descriptor data blocks point to stored data processed through the application task which is to be displayed, the method further comprising modifying the descriptor blocks in response to application tasks regardless of whether a virtual screen associated with a particular descriptor block is at that time being displayed.

31. The method as claimed in claim 29 further comprising generating in a software based rasterizer individual pixel data from data in the data storage memory to which the designated virtual screens point and storing the individual pixel data in a display memory on a pixel by pixel basis.

32. A method of displaying data in a data processing system comprising:

responsive to an application task, designating in an operating system as a plurality of viewports distinct portions of a physical display screen and designating corresponding distinct sections of data stored in a data storage memory to be displayed in the respective viewports;

displaying each designated section of data in its corresponding viewport portion of the physical display screen;

responsive to the application task, changing the designated distinct viewport portions of the physical display screen and independently, for each viewport, changing the designated distinct sections of stored data corresponding to each viewport to thus change the display of data; and updating the display to include changes in the stored data made by the application task.

33. A method as claimed in claim 32 wherein each of the viewports in the corresponding sections of data are designated in descriptor data blocks by the operating system of the data processing system.

34. A method as claimed in claim 33 wherein each descriptor block includes the size of the viewport and its logical location relative to data in the data storage memory, the method further comprising changing the logical location specified in the viewport descriptor data block in response to a cursor position indicated by the application task.

35. A method as claimed in claim 32 further comprising subdividing said distinct sections of data, stored in the data storage memory, into areas displayed in a fixed side-by-side relationship when displayed through the operating system and independently controlled by the application task software.

36. A method as claimed in claim 35 further comprising dividing for an area text data and other data to be superimposed in display of the area.

37. A method of displaying data in a data processing system comprising:

responsive to a plurality of application tasks, designating in an operating system a plurality of virtual screens for independent display on a physical display screen;

selecting one of the virtual screens and displaying that virtual screen in a first portion of the physical display screen in response to an input to the data processing system;

responsive to an application task, designating as a plurality of viewports distinct portions of the physical display screen and designating corresponding distinct sections of data stored in data storage memory to be displayed in the respective viewports;

responsive to an application task, changing the designated distinct viewport portions of the physical display screen and independently for each viewport changing the designated distinct sections of stored data corresponding to that viewport to thus change the display of data; and updating the display to include changes in the stored data made by an application task.

38. A method as claimed in claim 37 wherein each of the viewports in the corresponding sections of data are designated in descriptor data blocks by the operating system of the data processing system.

39. A method as in claim 38 wherein the virtual screens are designated in descriptor data blocks stored by the operating system and the descriptor data blocks point to stored data processed through the application task which is to be displayed, the method further comprising modifying the descriptor blocks in response to application tasks regardless of whether a virtual screen associated with a particular descriptor block is at that time being displayed.

40. A method as in claim 37 further comprising generating in a software based rasterizer individual pixel data from data in the data storage memory to which the designated virtual screens point and storing the individual pixel data in a display memory on a pixel by pixel basis.

41. A method as in claim 37 further comprising displaying, at a second portion of the physical display screen, identifiers corresponding to the designated virtual screens.

42. A method as claimed in claim 37 further comprising subdividing said distinct sections of data, stored in the data storage memory, into areas displayed in a fixed side-by-side relationship when displayed through the operating system and independently controlled by the application task software.

43. A method as claimed in claim 42 further comprising dividing for an area text data and other data to be superimposed in display of the area.

* * * * *